(No Model.)
B. F. McCARTY.
Wire Band Cutter.
No. 239,817.  Patented April 5, 1881.
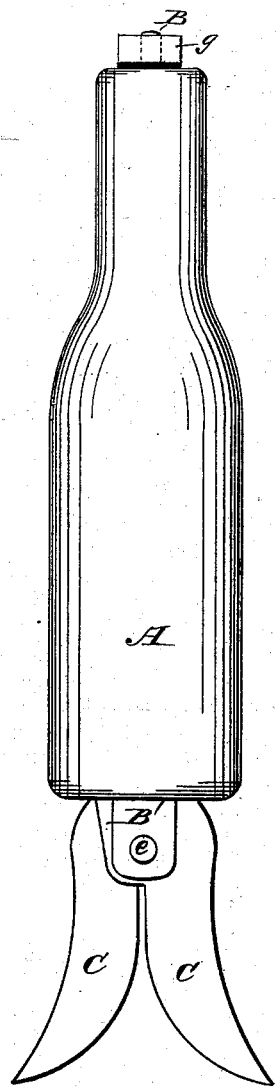
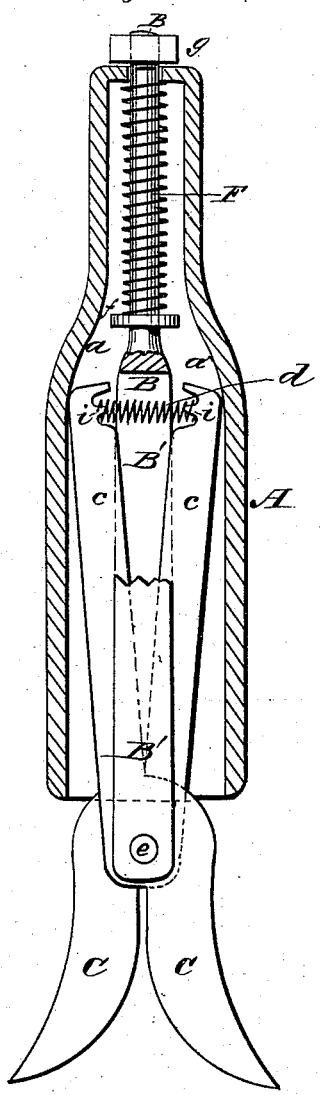
WITNESSES:
Francis McArdle.
C. Sedgwick
INVENTOR:
B. F. McCarty
BY Munn & Co
ATTORNEYS.
N. PETERS, PHOTO-LITHOGRAPHER, WASHINGTON, D. C.

UNITED STATES PATENT OFFICE.

BENJAMIN F. McCARTY, OF ROLLING PRAIRIE, INDIANA.

WIRE-BAND CUTTER.

SPECIFICATION forming part of Letters Patent No. 239,817, dated April 5, 1881.

Application filed February 1, 1881. (No model.)

*To all whom it may concern:*

Be it known that I, BENJAMIN F. MCCARTY, of Rolling Prairie, in the county of La Porte and State of Indiana, have invented a new and Improved Wire-Band-Cutting Implement, of which the following is a full, clear, and exact description.

Figure 1 is a plan view, and Fig. 2 is a central longitudinal section, of my improved band-cutter.

Similar letters of reference indicate corresponding parts.

The object of my invention is a convenient implement for cutting the wire bands of bundles or sheaves of grain before feeding the same to a thrashing-machine; and the invention consists of a hollow handle or casing having its upper end reduced in size, the casing being adapted to slide a suitable distance on a central spindle which carries a spring and the cutting-blades, the blades being so constructed and pivoted that the ends or shanks thereof will be brought together by the downward thrust of the handle or casing.

The hollow handle or casing A is reduced in size at its upper end, as shown, which forms the inclined shoulders $a\ a$ on the inside of the casing, and the casing is provided with the opening $b$ at the top, through which the end of the central spindle, B, passes. The spindle B is bifurcated, and has the blades C C pivoted between the parts B' B' thereof by the rivet $e$. The blades C C have their cutting-edges curved outwardly, and are each formed with the long shanks $c\ c$, which are held apart by the spring $d$, placed between them, and held in position by the projections $i\ i$. The spindle B is provided with the annular shoulder or spring-support $f$, and is secured in the handle or casing by the screw-nut $g$, the spring F being interposed between the shoulder $f$ and the top of the handle.

In use the implement should be held with the hand of the operator grasping the larger part of the casing, and brought forcibly down upon the band to be cut, the wire coming between the jaws or cutting-edges of the blades. The downward thrust of the blades being resisted when they come in contact with the band, the casing will slide upon the spindle, and the inclined shoulders of the inside of the casing, coming in contact with the ends of the shanks of the blades, will bring them suddenly together, causing the cutting-edges to sever the wire. As soon as the downward thrust ceases the parts will be carried back to place by the action of the springs.

Having thus described my invention, I claim as new and desire to secure by Letters Patent—

The wire-band cutter herein shown and described, consisting of the hollow sliding handle or casing A, formed with the inclined shoulders $a\ a$ on the inside, in combination with the spindle B, the pivoted blades C C, having the shanks $c\ c$, and the springs F and $d$, substantially as set forth.

BENJAMIN F. McCARTY.

Witnesses:
L. D. WEBBER,
SETH EASON.